United States Patent [19]
Masreliez et al.

[11] Patent Number: 6,029,363
[45] Date of Patent: Feb. 29, 2000

[54] SELF-CALIBRATING POSITION TRANSDUCER SYSTEM AND METHOD

[75] Inventors: Karl G. Masreliez, Bellevue; Nils Ingvar Andermo, Kirkland, both of Wash.

[73] Assignee: Mitutoyo Corporation, Kawasaki, Japan

[21] Appl. No.: 09/054,519

[22] Filed: Apr. 3, 1998

[51] Int. Cl.[7] .......................... G01B 7/14; G01R 35/00
[52] U.S. Cl. .......................... 33/706; 33/708; 324/601
[58] Field of Search .......................... 33/706, 707, 708, 33/356; 702/27, 72; 324/601

[56] References Cited

U.S. PATENT DOCUMENTS

| | | |
|---|---|---|
| 4,008,455 | 2/1977 | Pedersen . |
| 4,761,608 | 8/1988 | Franklin et al. . |
| 5,007,177 | 4/1991 | Rieder et al. ............................... 33/708 |
| 5,053,713 | 10/1991 | Henoch .................................. 324/601 |
| 5,333,390 | 8/1994 | Petterson et al. ......................... 33/706 |
| 5,386,642 | 2/1995 | Spies et al. ............................... 33/708 |
| 5,488,782 | 2/1996 | Ochiai ..................................... 33/708 |
| 5,689,203 | 11/1997 | Geist ...................................... 324/601 |
| 5,798,640 | 8/1998 | Gier et al. ............................... 33/708 |
| 5,861,754 | 1/1999 | Ueno et al. ............................... 33/706 |
| 5,924,214 | 7/1999 | Boege et al. .............................. 33/806 |
| 5,935,070 | 8/1999 | Dolazza et al. .......................... 600/443 |

FOREIGN PATENT DOCUMENTS 2207511  2/1989  United Kingdom .

*Primary Examiner*—Christopher W. Fulton
*Assistant Examiner*—Quyen Doan
*Attorney, Agent, or Firm*—Oliff & Berridge, PLC

[57] ABSTRACT

A self-calibrating position transducer system and method uses the position transducer itself as a position reference during calibration, thus eliminating using an external reference during calibration. The transducer signals are sampled at a plurality of evenly-spaced positions within each sampled scale wavelength, using the transducer itself as a position reference. The calibration values for the DC signal offsets, the amplitudes and non-orthogonality of the fundamental signals, the amplitudes of the signal harmonic components and position offsets are then determined using Fourier analysis techniques. The transducer signals are corrected using the determined calibration values, which are in turn used to revise the stored calibration values in anticipation of the next calibration operation. The self-calibrating position transducer uses the stored calibration values to enhance its accuracy.

21 Claims, 6 Drawing Sheets

SELF-CALIBRATING POSITION TRANSDUCER SYSTEM AND METHOD

BACKGROUND OF THE INVENTION

1. Field of Invention

This invention relates to position transducers. More specifically, this invention is directed to a position transducer system that can be calibrated for short range errors, without using an external position reference.

2. Description of Related Art

Various movement or position transducers for sensing linear, rotary or angular movement are currently available. These transducers are generally based on either optical systems, magnetic scales, inductive transducers or capacitive transducers.

FIG. 1 shows a generic transducer 100 having a scale 120, scale elements 122, a read head 110 and read head elements 112. The transducer may be optical, capacitive, magnetic or inductive.

The transducer 100 outputs two signals $S_s$ and $S_c$ that vary sinusoidally as a function of the position of the read head 110 relative to the scale 120 along a measuring axis 130. The signals $S_s$ and $S_c$ are basically identical except for a quarter-wavelength phase difference between them, as illustrated in FIG. 2. The transducer electronics use these two signals to derive the instantaneous position of the read head 110 relative to the scale 120 along the measuring axis 130.

Ideally, the signals $S_s$ and $S_c$ are perfect sinusoids with no DC offsets, have equal amplitudes, and are in exact quadrature (i.e., a quarter-wavelength out of phase relative to each other, also referred to as "orthogonal" herein). In practice, the signals $S_s$ and $S_c$ have small DC offsets, their amplitudes are not equal, and they have some orthogonality error. In addition $S_s$ and $S_c$ may have distorting harmonic components. In addition, the transducer electronics can introduce offset, gain, and non-linearity errors.

Calibrating the transducer 100 and compensating for these errors requires determining the DC signal offsets, the amplitudes of the fundamental signals $S_s$ and $S_c$, the non-orthogonality (i.e., the phase error) between the fundamental signals, and the amplitudes of the harmonic components. There are two commonly used prior transducer calibration methods.

The most common method is the "lissajous" method. The lissajous method typically comprises inputting the two nominally orthogonal readhead signals to an oscilloscope, to drive the vertical and horizontal axes of the oscilloscope. The read head is continuously scanned relative to the scale to generate changing signals. The oscilloscope display is observed, and the readhead is physically and electronically adjusted until the display indicates a "perfect" circle, centered at zero on both axes. Under this condition, the amplitude, orthogonality and offset of the two signals are properly adjusted.

The lissajous method assumes that the two signals are both perfect sinusoids. Typically, there is no adjustment for harmonic errors which can distort the circle, as it is hoped that these are made insignificant by fixed features of the transducer design and assembly. The lissajous method is well-known to those skilled in the art, and has been performed by sampling the two signals with computer-based data acquisition equipment.

Alternatively, it has also been common to accept any transducer errors due to imperfect amplitudes, orthogonality, harmonics and offsets, and to use an external reference, such as a laser interferometer, to accurately correct position errors from the read head 110 at the system level, at predetermined calibration positions relative to the scale 120.

Position transducers typically require initial factory calibration, and periodic calibration or certification thereafter. In both cases there is a cost for the associated equipment and labor. When the transducer 100 is located in a remote location, it is difficult to set up the external data acquisition equipment and/or accurate external reference required for calibration. As a result, the transducer 100 often has to be transported to another site or shipped back to the factory for calibration. This results in long down time and increased costs.

Even in cases where the transducer 100 does not have to be transported for calibration, the special tools and increased time required to set up the external display and/or reference result in increased costs and down time. Thus, calibration and recalibration is often minimized or avoided, in practice. Since most practical position transducers are sensitive to variations during production, installation, and use, measurement errors normally increase in the absence of calibration, and in the periods between recalibration.

SUMMARY OF THE INVENTION

Prior art position transducer systems have not included any way to conveniently identify and correct all of these errors outside of a permanent factory calibration environment. Harmonic errors have been especially inconvenient to identify and adjust. Furthermore, prior art methods have resulted in system error corrections that are fixed at the time of calibration, with no convenient way to adjust the corrections for subsequent alignment changes or aging of the transducer components.

This invention thus provides a self-calibrating position transducer system and method that does not require an external reference for calibration of short-range transducer errors.

The system and method of this invention uses the position transducer itself as the position reference during a high-resolution calibration of short range errors. Thus, special tools or instruments are not required to calibrate the position transducer. In addition, calibration may be performed continuously as a background task while the position transducer is operating. Thus, the system can keep the position transducer continuously calibrated without interfering with the transducer's normal operation.

The method of this invention samples the signals $S_s$ and $S_c$ at a plurality of evenly spaced positions within one scale period, using the transducer itself as a position reference. The method then determines calibration values for the DC signal offsets, the amplitudes and non-orthogonality of the fundamental signals, and the amplitudes of the signal harmonic components using Fourier analysis techniques. Finally, the method corrects the signals $S_s$ and $S_c$ using the determined calibration values.

In a preferred embodiment, the method samples the signals $S_s$ and $S_c$ at 4N evenly spaced calibration positions within one scale period, where N is the order of the highest order harmonic component for which the position transducer is being compensated. The values of the signals $S_s$ and $S_c$ are corrected using previously determined and stored calibration values. Next, the transducer positions that correspond to the corrected signal values are determined. If the determined transducer positions do not match the measured calibration positions, as measured by the transducer, the signal values are position-corrected so that they correspond to the measured calibration positions. The new calibration values are then determined by Fourier analysis of the position-corrected signal values. The new calibration values are added to the old stored calibration values. The process is repeated until the new calibration values are below the predetermined limits.

This method is particularly valuable for position transducers which require accurate high-resolution interpolation of the transducer signal within a wavelength. In the past, this has been relatively less important for optical position transducers, which inherently have shorter wavelengths and therefore require only low interpolation levels (1/40 of a wavelength, for example) to achieve resolution on the order of one micron and below. However, for newer types of position transducers, such as inductive and capacitive, the wavelengths are inherently longer and much higher interpolation levels within a wavelength are required in order to achieve micron-level resolution and accuracy. Also, even higher levels of resolution are now being expected of optical position transducers. Thus, this invention significantly enhances the utility of both long-wavelength type position sensors and other types of position sensors, by providing a method for low-cost and extremely accurate high-resolution calibration for short-range errors.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
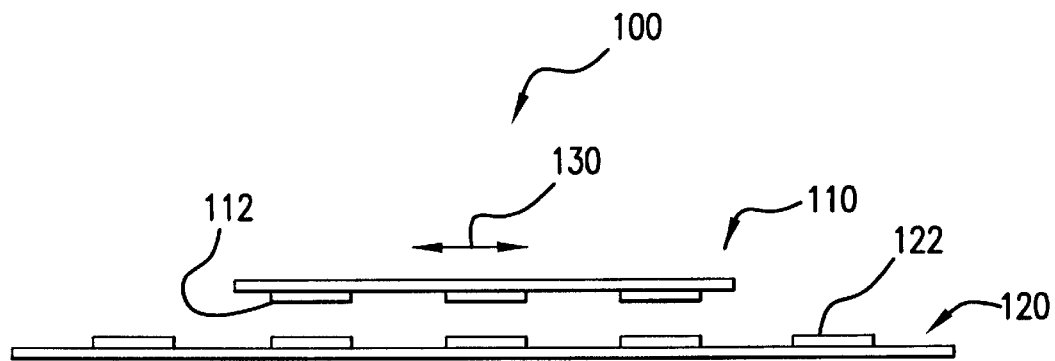
FIG. 1 is a schematic diagram of a generic position transducer.
Figure 2:
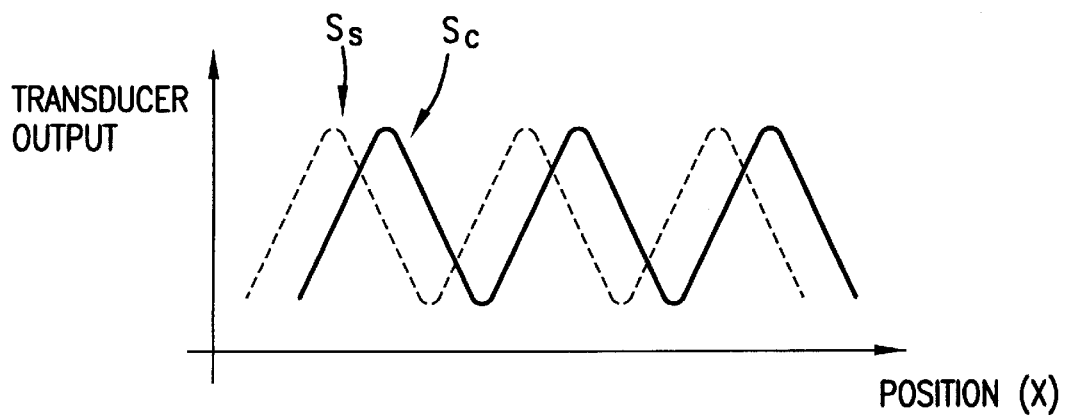
FIG. 2 illustrates the signals $S_s$ and $S_c$ output by the position transducer of FIG. 1 as a function of relative read head to scale position along the measuring axis.
Figure 3:
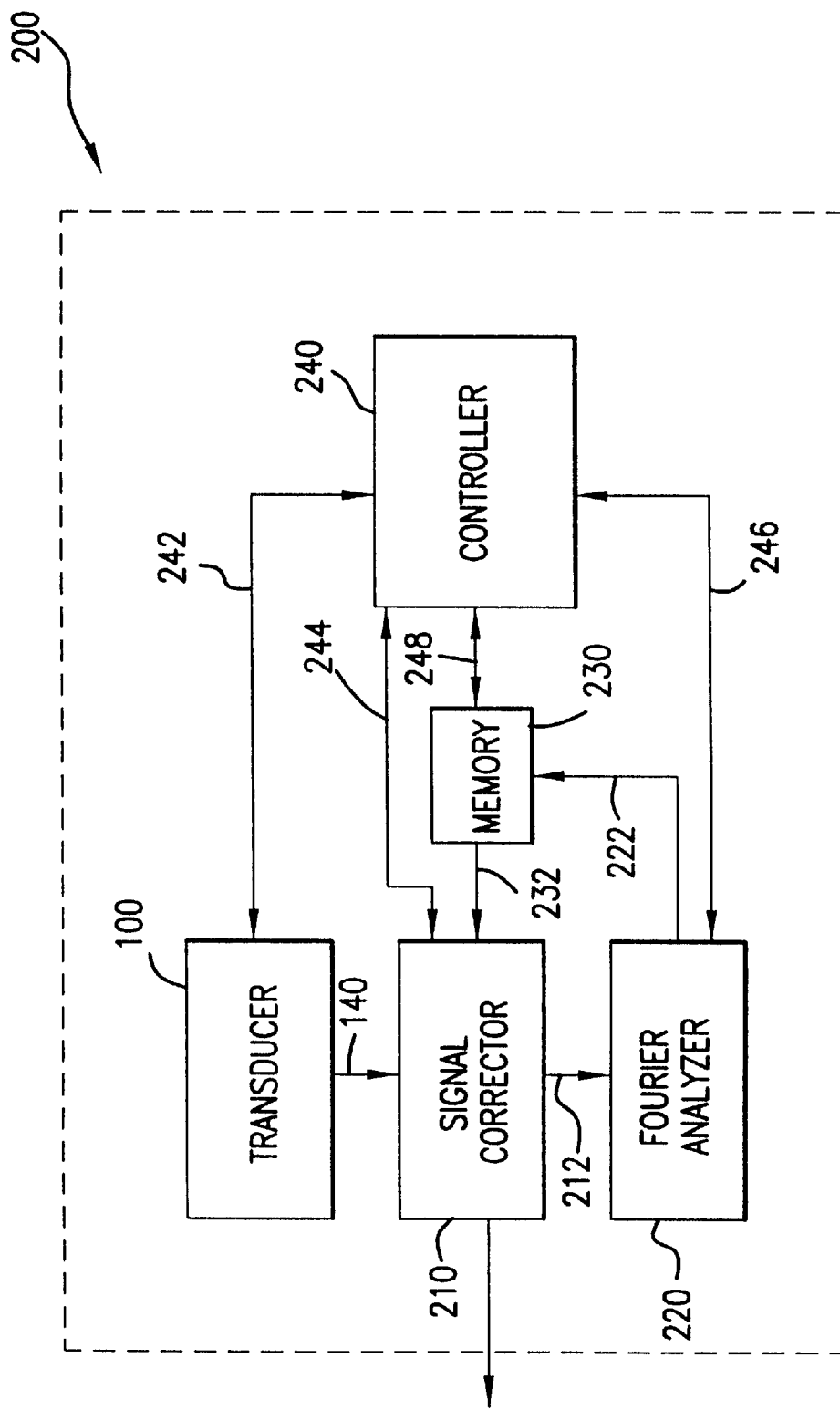
FIG. 3 is a block diagram of a self-calibrating position transducer system of this invention.

FIG. 3 illustrates the self-calibrating position transducer system 200 of this invention. The self-calibrating position transducer system 200 includes the transducer 100, a signal corrector 210, a Fourier analyzer 220, a memory 230, and a controller 240.

As described above, the transducer 100 generates transducer signals $S_c$ and $S_s$ and outputs the signals to the signal corrector 210 over a signal line 140. The signal corrector 210 receives calibration values $C_i$ from the memory 230 over a signal line 232. The signal corrector 210 uses the calibration values $C_i$ to correct the transducer signals $S_c$ and $S_s$ from the transducer 100 and sends the corrected transducer signals $S_c$ and $S_s$ to the Fourier analyzer 220 over a signal line 212.

The signal corrector 210 also outputs a position information signal. The position information signal is determined from the transducer signals $S_c$ and $S_s$ and the calibration values $C_i$. Alternatively, the position signal is determined from the corrected transducer signals $S_c$ and $S_s$. In particular, the position information signal can be a position signal indicating the relative position between the read head 110 and the scale 120.

The Fourier analyzer 220 determines new calibration values $C_{i+1}$, and sends the new calibration values $C_{i+1}$ to the memory 230 over a signal line 222, where they are added to the old calibration values. The controller 240 outputs drive signals to the transducer 100 over the signal line 242 and control signals over the signal lines 244, 246 and 248 to the signal corrector 210, the Fourier analyzer 220 and the memory 230, respectively.

The controller 240, the Fourier analyzer 220 and the signal corrector 210 are preferably implemented on a single, programmed, general purpose microprocessor or microcontroller and peripheral integrated circuit elements. Furthermore, while FIG. 3 shows the signal lines 212, 222, and 232 as independent signal lines, these signal lines can be replaced with a single data bus. Similarly, the control signal lines 244, 246 and 248 can be replaced with a single control bus. Finally, all these signal lines can be replaced with a single data/control bus.

However, the controller 240, the Fourier analyzer 220 and the signal corrector 210 can also be implemented, collectively or individually, by an ASIC or other integrated circuit, a hardwired electronic or logic circuit such as a discrete element circuit, a programmable logic device such as a FPGA, PLD, PLA or PAL, or the like. In general, any device or set of devices on which a finite state machine capable of implementing the flowchart shown in FIG. 8 and the equations set forth below can be used to implement the controller 240, the Fourier analyzer 220 and/or the signal corrector 210. The memory 230 is preferably implemented using static or dynamic RAM. However, the memory 230 can also be implemented using flash memory or the like.

Figure 4:
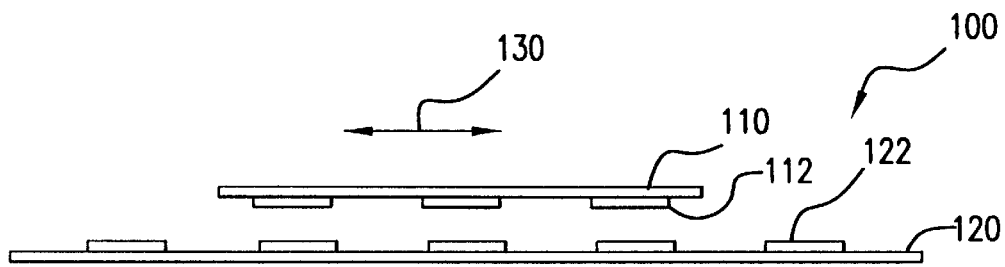
FIGS. 4–6 are schematic diagrams of the position transducer of FIG. 1 with the read head at three separate positions relative to the scale.

FIG. 4 shows a first relative position $P_1$ of the read head 120 relative to the scale 110 of the transducer 100 along the measuring axis 130. The transducer 100 is preferably an induced current position transducer. This invention can be used with the various incremental and absolute position embodiments of such an induced current position transducer disclosed in co-pending U.S. patent application Ser. No. 08/441,769, filed May 16, 1995, Ser. Nos. 08/645,483 and 08/645,490, both filed May 13, 1996, Ser. Nos. 08/788,469, 08/790,494 and 08/790,459 filed Jan. 29, 1997, Ser. No. 08/834,432, filed Apr. 16, 1997, and Ser. No. 08/916,429, filed Aug. 25, 1997, each incorporated herein by reference in its entirety. However, the transducer 100 may also be an optical-type transducer, a capacitive-type transducer, a magnetic-type transducer, or the like.

Figure 5:
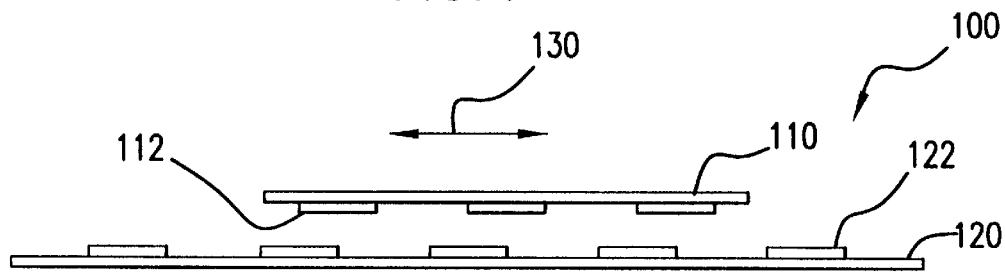
Figure 6:
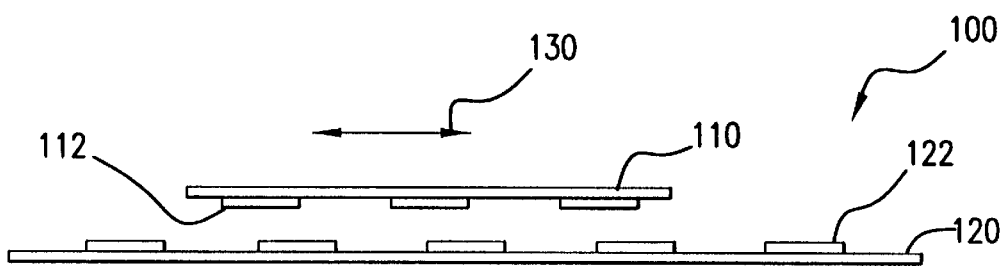

In operation, the scale elements 122 and the read head elements 112 cooperate to generate quadrature signals $S_s$ and $S_c$ that vary as a function of the read head 110 position relative to the scale 120. The variation is nominally sinusoidal, but in practice may include significant harmonic content. FIGS. 5 and 6 show the second and third relative positions $P_2$ and $P_3$ of the read head 110 relative to the scale 120 along the measuring axis 130.

Figure 7:
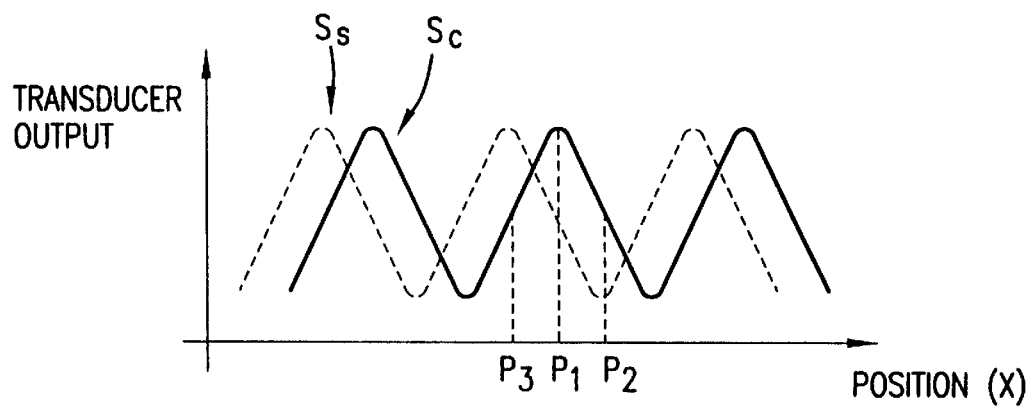
FIG. 7 illustrates output as a function of read head position for one of the primary signals of the position transducer of FIGS. 4–6.

The read head elements 112 of typical position transducers, including nearly all commercially available encoders, are constructed such that the signals $S_s$ and $S_c$ are basically identical except for a quarter-wavelength phase difference between them, as described above and as illustrated in FIG. 7. FIG. 7 also illustrates the signal values that correspond to the relative positions $P_1$, $P_2$ and $P_3$ of the transducer 100 shown in FIGS. 4–6. The signal $S_c$ is symmetrical around a maximum value at position $P_1$. Another characteristic feature of the signal $S_c$ is the fact that $S_c(x) = -S_c(x+\lambda/2)$, i.e., there is a mirror symmetry between the two half periods with respect to the position axis (x-axis). Thus, only odd-order harmonic components are present in the signal $S_c$. Similarly, only odd-order harmonic components are present in the signal $S_s$. Furthermore, the phases of the harmonic components are either zero or $\pi$.

The primary transducer signals $S_s$ and $S_c$ in their general form are:

$$S_s = A_s \sin v + \sum_{p=2}^{\infty} A_{sp} \sin(pv + \varphi_{sp}) + \mu_s \qquad (1)$$

$$S_c = A_c \cos(v + \varepsilon) + \sum_{p=2}^{\infty} A_{cp} \cos(pv + \varphi_{cp}) + \mu_c \qquad (2)$$

where:

$S_s$ is the output sine primary signal;

$S_c$ is the output cosine primary signal;

$A_s$ is the amplitude of the fundamental of the output sine primary signal;

$A_c$ is the amplitude of the fundamental of the output cosine primary signal;

$v$ is equal to $(x/\lambda_s)2\pi$, where x is the error-free transducer position, and $\lambda_s$ is the scale wavelength;

$\varepsilon$ is the non-orthogonality between the fundamentals of the output sine and cosine primary signals;

$A_{sp}$ are the amplitudes of the harmonics p of the output sine primary signal, where p=2, 3, . . . ;

$A_{cp}$ are the amplitudes of the harmonics p of the output cosine primary signal, where p=2, 3, . . . ;

$\phi_{sp}$ are the phases of the harmonics p of the output sine primary signal, where p=2, 3, . . . ;

$\phi_{cp}$ are the phases of the harmonics p of the output cosine primary signal, where p=2, 3, . . . ;

$\mu_s$ is the DC offset of the output sine primary signal; and $\mu_c$ is the DC offset of the output cosine primary signal.

The scale elements 122 are positioned on the scale 120 in a periodic pattern. The scale wavelength $\lambda_s$ is the wavelength of this periodic pattern. The read head elements 112 are also usually positioned on the read head 110 in a periodic pattern. The read head wavelength $\lambda_r$ is preferably equal to the scale wavelength $\lambda_s$.

The position x of the read head 110 relative to the scale 120 is, to a close approximation (assuming the orthogonality error, $\varepsilon$, is small):

$$x = \frac{\lambda_s}{2\pi} \cot^{-1}\left(\frac{F_d}{F_n} + \varepsilon\right) \qquad (3)$$

where:

$$F_n = A_c(S_s - \Sigma A_{sp} \sin(pv + \phi_{sp}) - \mu_s), \qquad (4)$$

and $$F_d = A_s(S_c - \Sigma A_{cp} \cos(pv + \phi_{cp}) - \mu_c) \qquad (5)$$

The values $A_s$, $A_c$, $A_{sp}$, $A_{cp}$, $\phi_{sp}$, $\phi_{cp}$, $\mu_s$, $\mu_c$ and $\varepsilon$ are determined by Fourier analysis, using the position transducer itself as a position reference. First, the output primary signals $S_s$ and $S_c$ are normalized to the amplitudes of their fundamentals:

$$s_s = \frac{S_s}{A_s} = \sin v + \sum_{p=2}^{\infty} a_{sp} \sin(pv + \varphi_{sp}) + m_s, \qquad (6)$$

and $$s_c = \frac{S_c}{A_c} = \cos(v + \varepsilon) + \sum_{p=2}^{\infty} a_{cp} \cos(pv + \varphi_{cp}) + m_c, \qquad (7)$$

where:

$$a_{sp} = \frac{A_{sp}}{A_s};$$

$$a_{cp} = \frac{A_{cp}}{A_c};$$

$$m_s = \frac{\mu_s}{A_s};$$

and $$m_c = \frac{\mu_c}{A_c}.$$

The position transducer measures:

$$F = \tan^{-1}\frac{S_s}{S_c} = \tan^{-1}\left(r\frac{s_s}{s_c}\right) \qquad (8)$$

where:

$r = A_s/A_c.$

The primary signals $S_s$ and $S_c$ are sampled at M evenly-spaced calibration positions within one scale wavelength $\lambda_s$ of the transducer 100. M is preferably equal to 4N, where N is the order of the highest order harmonic component for which the output primary signals $S_c$ and $S_s$ are being compensated. Alternatively, if samples are not perfectly evenly spaced, the values of the signals may be adjusted by interpolation/extrapolation according to a set of reasonable assumptions based on the transducer design and the actual sampled signal values. To obtain the positions at which the position transducer 100 preferably samples the primary signals $S_s$ and $S_c$ for the Fourier analysis, equations (6) and (7) are plugged into equation (8) to obtain:

$$F(v, m_s, m_c, r, \varepsilon, a_{sp}, a_{cp}) = \frac{r(\sin v + \sum a_{sp}\sin(pv + \varphi_{sp})) + m_s}{\cos(v + \varepsilon) + \sum a_{cp}\cos(pv + \varphi_{cp}) + m_c}$$

$$= \tan\left(n\frac{2\pi}{M} + \varphi\right) \quad (9)$$

where:

n=0, ..., M−1; and

φ is an arbitrary initial angle for the analysis.

If u is defined as n((2 π/M)+φ), and setting v=u, r=1, and $a_{sp}=a_{cp}=m_s=m_c=\epsilon=0$, equation (9) can be rewritten as:

$$F(u, o, o, 1, o, o, o) + dF = \frac{\sin u}{\cos u} = \tan u. \quad (10)$$

Since F(u,0,0,1,0,0,0)=tan(u), dF is equal to 0.

Next, dF is determined as:

$$dF = \frac{\delta F}{\delta v}dv + \frac{\delta F}{\delta m_s}m_s + \frac{\delta F}{\delta m_c}m_c + \quad (11)$$
$$\frac{\delta F}{\delta r}dr + \frac{\delta F}{\delta \varepsilon}\varepsilon + \sum \frac{\delta F}{\delta a_{sp}}a_{sp} + \sum \frac{\delta F}{\delta a_{cp}}a_{cp},$$

where the partial derivatives are evaluated for v=u, r=1, and $a_{sp}=a_{cp}=m_s=m_c=\epsilon=0$. The derivatives are thus:

$$\frac{\delta F}{\delta v} = \frac{1}{\cos^2 u},$$

$$\frac{\delta F}{\delta m_s} = \frac{1}{\cos u},$$

$$\frac{\delta F}{\delta m_c} = -\frac{\sin u}{\cos^2 u},$$

$$\frac{\delta F}{\delta r} = \tan u,$$

$$\frac{\delta F}{\delta \varepsilon} = \tan^2 u,$$

$$\frac{\delta F}{\delta a_{sp}} = \frac{\sin(pu + \varphi_{sp})}{\cos u},$$

and $$\frac{\delta F}{\delta a_{cp}} = -\frac{\sin u \cos(pu + \varphi_{cp})}{\cos^2 u}.$$

Equation (11) can then be expressed as:

$$dF = \frac{1}{\cos^2 u}dv + \frac{1}{\cos u}m_{si} - \frac{\sin u}{\cos^2 u}m_c + \tan u \, dr + \quad (12)$$
$$\tan^2 u \varepsilon + \sum \frac{\sin(pu + \varphi_{sp})}{\cos u}a_{sp} - \sum \frac{\sin u \cos(pu + \varphi_{cp})}{\cos^2 u}a_{cp}.$$

Setting dF=0 yields:

$$dv = -m_s\cos u + m_c\sin u - dr\sin u\cos u - \varepsilon\sin^2 u - \quad (13)$$
$$\sum a_{sp}\cos u \sin(pu + \varphi_{sp}) + \sum a_{cp}\sin u \cos(pu + \varphi_{cp}).$$

Next, u+dv can be inserted for v into the expressions for $s_s$ and $s_c$. For simplicity, we include only one, arbitrary, harmonic p. The result can easily be extended to be valid for any combination of harmonics by summation. Thus, assuming errors are small so that terms containing error parameters of order two and higher can be neglected, $s_s$ and $s_c$ become:

$$s_s(u + dv) = \sin(u + dv) + a_{sp}\sin(pu + \varphi_{sp} + pdv) + m_s$$
$$\approx \sin u \cdot 1 + \cos u \cdot dv + a_{sp}\sin(pu + \varphi_{sp}) \cdot$$
$$1 + a_{sp}\cos(pu + \varphi_{sp})pdv + m_s$$
$$\approx \sin u + \cos u \cdot dv + a_{sp}\sin(pu + \varphi_{sp}) + m_s.$$

$$s_s(u + dv) = \sin u + \cos u(-m_s\cos u + m_c\sin u - dr\sin u\cos u - \varepsilon\sin^2 u -$$
$$a_{sp}\cos u\sin(pu + \varphi_{sp}) + a_{cp}\sin u\cos(pu + \varphi_{sp})) +$$
$$a_{sp}\sin(pu + \varphi_{sp}) + m_s.$$

$$s_s(u + dv) = \sin u + m_s\sin^2 u + m_c\sin u\cos u - dr\sin u\cos^2 u -$$
$$\varepsilon\sin^2 u\cos u - a_{sp}\cos^2 u\sin(pu + \varphi_{sp}) +$$
$$a_{cp}\sin u\cos u\cos(pu + \varphi_{sp}) + a_{sp}\sin(pu + \varphi_{sp}).$$

$$s_s(u + dv) = \sin u + \frac{m_s}{2} - \frac{m_s}{2}\cos 2u + \frac{m_c}{2}\sin 2u - \frac{dr}{2}\sin u -$$
$$\frac{dr}{2}\sin u\cos 2u - \frac{\varepsilon}{2}\cos u + \frac{\varepsilon}{2}\cos u\cos 2u -$$
$$\frac{a_{sp}}{2}\sin(pu + \varphi_{sp}) - \frac{a_{sp}}{2}\sin(pu + \varphi_{sp})\cos 2u +$$
$$\frac{a_{cp}}{2}\cos(pu + \varphi_{sp})\sin 2u + a_{sp}\sin(pu + \varphi_{sp}).$$

$$s_s(u + dv) = \frac{m_s}{2} + \sin u - \frac{dr}{4}\sin u - \frac{\varepsilon}{4}\cos u - \frac{m_s}{2}\cos 2u + \frac{m_c}{2}\sin 2u -$$
$$\frac{dr}{4}\sin 3u + \frac{\varepsilon}{4}\cos 3u - \frac{a_{sp}}{4}\sin((p - 2)u + \varphi_{sp})) -$$
$$\frac{a_{cp}}{4}\sin((p - 2)u + \varphi_{cp})) + \frac{a_{sp}}{2}\sin((pu + \varphi_{sp})) -$$
$$\frac{a_{sp}}{4}\sin((p + 2)u + \varphi_{sp})) + \frac{a_{cp}}{4}$$
$$\sin((p + 2)u + \varphi_{cp}).$$

Similarly:

$$s_c(u + dv) = \cos(u + \varepsilon + dv) + a_{cp}\cos(pu + \varphi_{cp} + p(dv + \varepsilon)) + m_c$$
$$\approx \cos u \cdot 1 - \sin u \cdot (dv + \varepsilon) + a_{cp}\cos(pu + \varphi_{cp}) \cdot$$
$$1 - a_{cp}\sin(pu + \varphi_{cp})p(dv + \varepsilon) + m_c$$
$$\approx \cos u - \sin u(dv + \varepsilon) + a_{cp}\cos(pu + \varphi_{cp}) + m_c.$$

$$s_c(u + dv) =$$
$$\cos u - \sin u(-m_s\cos u + m_c\sin u - dr\sin u\cos u - \varepsilon\sin^2 u - a_{sp}\cos u\sin(pu +$$
$$\varphi_{sp}) + a_{cp}\sin u\cos(pu + \varphi_{cp}) + \varepsilon) + a_{cp}\cos(pu + \varphi_{cp}) + m_c.$$

$$s_c(u + dv) = \cos u + m_s\sin u\cos u - m_c\sin^2 u + dr\sin^2 u\cos u -$$
$$\varepsilon\sin u\cos^2 u + a_{sp}\sin u\cos u\sin(pu + \varphi_{sp}) -$$
$$a_{cp}\sin^2 u\cos(pu + \varphi_{cp}) + a_{cp}\cos(pu + \varphi_{cp}) + m_c$$

$$s_c(u + dv) = \cos u + \frac{m_s}{2}\sin 2u + \frac{m_c}{2} + \frac{m_c}{2}\cos 2u + \frac{dr}{2}\cos u -$$
$$\frac{dr}{2}\cos u\cos 2u - \frac{\varepsilon}{2}\sin u - \frac{\varepsilon}{2}\sin u\cos 2u + \frac{a_{sp}}{2}\sin 2u\sin(pu + \varphi_{sp}) -$$
$$\frac{a_{cp}}{2}\cos(pu + \varphi_{cp}) + \frac{a_{cp}}{2}\cos(pu + \varphi_{cp})\cos 2u + a_{cp}\cos(pu + \varphi_{cp}).$$

$$s_c(u + dv) = \cos u + \frac{m_s}{2}\sin 2u + \frac{m_c}{2} + \frac{m_c}{2}\cos 2u + \frac{dr}{2}\cos u - \frac{dr}{4}\cos 3u -$$
$$\frac{dr}{4}\cos u - \frac{\varepsilon}{2}\sin u - \frac{\varepsilon}{4}\sin 3u + \frac{\varepsilon}{4}\sin u + \frac{a_{sp}}{2}\cos(pu + \varphi_{cp}) -$$

-continued $$\frac{a_{sp}}{4}\cos((p+2)u+\varphi_{sp}) + \frac{a_{sp}}{4}\cos((p-2)u+\varphi_{sp}) +$$

$$\frac{a_{cp}}{4}\cos((p+2)u+\varphi_{cp}) + \frac{a_{cp}}{4}\cos((p-2)u+\varphi_{cp}).$$

$$s_c(u+dv) = \frac{m_c}{2} + \cos u + \frac{dr}{4}\cos u - \frac{\varepsilon}{4}\sin u + \frac{m_s}{2}\sin 2u +$$

$$\frac{m_c}{2}\cos 2u - \frac{dr}{4}\cos 3u - \frac{\varepsilon}{4}\sin 3u + \frac{a_{sp}}{4}\cos((p-2)u+\varphi_{sp}) +$$

$$\frac{a_{cp}}{4}\cos((p-2)u+\varphi_{cp}) + \frac{a_{cp}}{2}\cos(pu+\varphi_{cp}) -$$

$$\frac{a_{sp}}{4}((p+2)u+\varphi_{sp}) + \frac{a_{cp}}{4}\cos((p+2)u+\varphi_{cp}).$$

The final results for $s_s$ and $s_c$ are summarized as:

$$s_s = \frac{m_s}{2} + \sin u - \frac{dr}{4}\sin u - \frac{\varepsilon}{4}\cos u - \frac{m_s}{2}\cos 2u + \quad (14)$$

$$\frac{m_c}{2}\sin 2u - \frac{dr}{4}\sin 3u + \frac{\varepsilon}{4}\cos 3u - \frac{a_{sp}}{4}\sin((p-2)u+\varphi_{sp}) -$$

$$\frac{a_{cp}}{4}\sin((p-2)u+\varphi_{cp}) + \frac{a_{sp}}{2}\sin(pu+\varphi_{sp}) -$$

$$\frac{a_{sp}}{4}\sin((p+2)u+\varphi_{sp}) + \frac{a_{cp}}{4}\sin((p+2)u+\varphi_{cp}).$$

$$s_c = \frac{m_c}{2} + \cos u + \frac{dr}{4}\cos u - \frac{\varepsilon}{4}\sin u + \frac{m_s}{2}\sin 2u + \quad (15)$$

$$\frac{m_c}{2}\cos 2u - \frac{dr}{4}\cos 3u - \frac{\varepsilon}{4}\sin 3u + \frac{a_{sp}}{4}\cos((p-2)u+\varphi_{sp}) +$$

$$\frac{a_{cp}}{4}\cos((p-2)u+\varphi_{cp}) + \frac{a_{cp}}{2}\cos(pu+\varphi_{cp}) -$$

$$\frac{a_{sp}}{4}\cos((p+2)u+\varphi_{sp}) + \frac{a_{cp}}{4}\cos((p+2)u+\varphi_{cp}).$$

For simplicity, only one arbitrary harmonic component of order p has been described. However, it should be appreciated that the analysis can easily be extended to any combination of harmonic orders by summation.

The normalized signals $s_s$ and $s_c$ are basically identical, except for a quarter-wavelength phase difference between them. If $s_s(u)$ is known, $s_c(u)$ can be obtained by disregarding the offsets $m_s$ and $m_c$ and setting $s_c(u)$ to:

$$s_c(u) = s_s(u+\pi/2+\varepsilon) = \quad (16)$$

$$\sin(u+\pi/2+\varepsilon) + \sum a_{sp}\sin(p(u+\pi/2+\varepsilon)+\varphi_{sp});$$

$$s_c(u) = \cos(u+\varepsilon) + \sum a_{sp}\cos\left(pu + \frac{p-1}{2}\pi + p\varepsilon + \varphi_{sp}\right);$$

$$s_c(u) \approx \cos(u+\varepsilon) + \sum a_{sp}\cos\left(pu + \frac{p-1}{2}\pi + \varphi_{sp}\right).$$

The quantity $(p-1)/2$ is a whole number because p is an odd number. If, still disregarding the offsets $m_s$ and $m_c$, $$s_c = \cos(u+\varepsilon) + \Sigma a_{cp}\cos(pu+\phi_{cp}), \quad (17)$$

then the following relationships are true:

$$a_{cp} = a_{sp} = a_p; \quad (18)$$

$$\phi_{cp} = \phi_{sp}+\pi, \ p=3, 7, 11, \text{ etc.}; \quad (19)$$

and $$\phi_{cp} = \phi_{sp}, \ p=5, 9, 13, \text{ etc.} \quad (20)$$

Using the relationships outlined in equations (10)–(20), the expressions for the signals $s_s$ and $s_c$ can be simplified. For the harmonics of order p=3, 7, 11, etc., the signals $s_s$ and $s_c$ become:

$$s_{s3,7...} = \frac{m_s}{2} + \sin u - \frac{dr}{4}\sin u - \frac{\varepsilon}{4}\cos u - \frac{m_s}{2}\cos 2u + \frac{m_c}{2}\sin 2u - \quad (21)$$

$$\frac{dr}{4}\sin 3u + \frac{\varepsilon}{4}\cos 3u + \frac{a_p}{2}\sin(pu+\varphi_{sp}) - \frac{a_{(p+2)}}{2}\sin(pu+\varphi_{s(p+2)});$$

$$s_{c3,7...} = \frac{m_c}{2} + \cos u + \frac{dr}{4}\cos u - \frac{\varepsilon}{4}\sin u + \frac{m_s}{2}\sin 2u + \frac{m_c}{2}\cos 2u - \quad (22)$$

$$\frac{dr}{4}\cos 3u - \frac{\varepsilon}{4}\sin 3u - \frac{a_p}{2}\cos(pu+\varphi_{sp}) + \frac{a_{(p+2)}}{2}\cos(pu+\varphi_{s(p+2)}).$$

For harmonics of order p=5, 9, 13, etc., the signals $s_s$ and $s_c$ become $$s_{s5,9...} = \frac{m_s}{2} + \sin u - \frac{dr}{4}\sin u - \frac{\varepsilon}{4}\cos u - \frac{m_s}{2}\cos 2u + \frac{m_c}{2}\sin 2u - \quad (23)$$

$$\frac{dr}{4}\sin 3u + \frac{\varepsilon}{4}\cos 3u - \frac{a_{(p-2)}}{2}\sin(pu+\varphi_{s(p-2)}) + \frac{a_p}{2}\sin(pu+\varphi_{sp});$$

$$s_{c5,9...} = \frac{m_c}{2} + \cos u + \frac{dr}{4}\cos u - \frac{\varepsilon}{4}\sin u + \frac{m_s}{2}\sin 2u + \frac{m_c}{2}\cos 2u - \quad (24)$$

$$\frac{dr}{4}\cos 3u - \frac{\varepsilon}{4}\sin 3u - \frac{a_{(p-2)}}{2}\cos(pu+\varphi_{s(p-2)}) + \frac{a_p}{2}\cos(pu+\varphi_{sp}).$$

From this result, it is evident that the $3^{rd}$-order and $5^{th}$-order harmonic components cannot be computed independently from each other. This is also true for harmonic component order pairs 7 and 9, 11 and 13, etc.

Fourier analysis is now performed on the signals $s_s$ and $s_c$. Fourier analysis is performed by summing M evenly-spaced samples of the signals $S_s$ and $S_c$, weighted by factors $\sin(qu)$ and $\cos(qu)$. For q=1, the summation yields the amplitude and phase of the fundamental. For q=2, 3, etc., the summation yields the amplitudes and phases of the second order, third order, etc. harmonic components, respectively.

The number of samples M for the Fourier analysis is preferably not equal to any of the harmonic orders contained in the quantities to be summed, because their harmonic terms will not generally be averaged out. This can be illustrated by inserting "$u = n(2\pi/M)+\phi$" as the argument of a term of harmonic order M (i.e., $\sin(Mu)$). This results in the quantity "$\sin(n2\pi+M\phi)$". This quantity will not be averaged out, except for the special case when the initial phase $\phi$ of the analysis is chosen to be $v\cdot(\pi/M)$, where $v=0, 1, 2$, etc.

Similarly, for cosine terms of the same order as the number of samples M, the initial phase $\phi$ has to be "$(\pi/2+v\cdot\pi)/M$" for these terms to average to 0. Therefore, there is no initial phase $\phi$ for which both the sine and cosine terms average to 0.

From equations (21) or (23), and (22) or (24) we obtain the measured, normalized mean values, $m_s'$ and $m_c'$, respectively:

$$m_s' = \frac{1}{M}\sum_{j=0}^{M-1} s_{sj} = \frac{1}{2}m_s, \text{ and} \quad (25)$$

$$m_c' = \frac{1}{M}\sum_{j=0}^{M-1} s_{cj} = \frac{1}{2}m_s, \quad (26)$$

where "j" represents the sample number. The measured, actual offsets $\mu_s'$ and $\mu_c'$ are thus:

$$\mu_s' = A_s m_s' = \tfrac{1}{2} A_s m_s = \tfrac{1}{2} \mu_s, \qquad (27)$$

and $$\mu_c' = A_c m_c' = \tfrac{1}{2} A_c m_c = \tfrac{1}{2} \mu_c. \qquad (28)$$

That is, the real mean values $\mu_s$ and $\mu_c$ of the signals $S_s$ and $S_c$ are equal to double the measured ones.

Again using equations (21), (22), (23), and (24) the Fourier analysis yields for the measured amplitude components ($a_{s1s}'$, $a_{s1c}'$, $a_{c1s}'$ and $a_{c1c}'$) of the fundamentals (i.e., p=1):

$$a_{s1s}' = \frac{2}{M}\sum_{j=0}^{M-1} \sin u \cdot s_{sj} = 1 - \frac{dr}{4}, \qquad (29)$$

$$a_{s1c}' = \frac{2}{M}\sum_{j=0}^{M-1} \cos u \cdot s_{sj} = -\frac{\varepsilon}{4}, \qquad (30)$$

$$a_{c1s}' = \frac{2}{M}\sum_{j=0}^{M-1} \sin u \cdot s_{cj} = -\frac{\varepsilon}{4}, \text{ and} \qquad (31)$$

$$a_{c1c}' = \frac{2}{M}\sum_{j=0}^{M-1} \cos u \cdot s_{cj} = 1 + \frac{dr}{4}. \qquad (32)$$

These results are independent of the harmonic content of the signals. The amplitude components ($A_{s1s}$, $A_{s1c}$, $A_{c1s}$ and $A_{c1c}$) of the fundamentals (i.e., p=1) are:

$$A_{s1s}' = A_s a_{s1s}' = A_s\left(1 - \frac{dr}{4}\right), \qquad (33)$$

$$A_{s1c}' = A_s a_{s1c}' = -A_s \frac{\varepsilon}{4}, \qquad (34)$$

$$A_{c1s}' = A_c a_{c1s}' = -A_c \frac{\varepsilon}{4}, \text{ and} \qquad (35)$$

$$A_{c1c}' = A_c a_{c1c}' = A_c\left(1 + \frac{\varepsilon}{4}\right). \qquad (36)$$

The measured phases $\phi_{1s}'$ and $\phi_{1c}'$ of the fundamentals (p=1) are:

$$\varphi_{1s}' = \tan^{-1}\frac{A_{s1s}'}{A_{s1c}'} = \frac{\pi}{2} - \tan^{-1}\frac{A_{s1c}'}{A_{s1s}'} \approx \frac{\pi}{2} - \frac{A_{s1c}'}{A_{s1s}'} = \frac{\pi}{2} + \frac{\varepsilon}{4}, \text{ and} \qquad (37)$$

$$\varphi_{1c}' = \tan^{-1}\frac{A_{c1s}'}{A_{c1c}'} \approx \frac{A_{c1s}'}{A_{c1c}'} = -\frac{\varepsilon}{4}. \qquad (38)$$

The measured non-orthogonality $\varepsilon'$ is:

$$\varepsilon' = \varphi_{1s}' - \varphi_{1c}' - \frac{\pi}{2} = -\frac{A_{s1c}'}{A_{s1s}'} - \frac{A_{c1s}'}{A_{c1c}'} = \frac{\varepsilon}{4} + \frac{\varepsilon}{4} = \frac{\varepsilon}{2}. \qquad (38a)$$

That is, the measured non-orthogonality $\varepsilon'$ is half of the actual non-orthogonality $\varepsilon$.

The amplitudes (measured) of the fundamentals, $A_s'$ and $A_c'$ are determined as:

$$A_s' = \sqrt{A_{s1c}'^2 + A_{s1s}'^2} \approx A_s\left(1 - \frac{dr}{4}\right), \text{ and} \qquad (39)$$

$$A_c' = \sqrt{A_{c1c}'^2 + A_{c1s}'^2} \approx A_c\left(1 - \frac{dr}{4}\right). \qquad (40)$$

The measured amplitude mismatch dr' is:

$$dr' = \frac{A_s'}{A_c'} - 1 = \frac{A_s}{A_c} \frac{1 - \frac{dr}{4}}{1 + \frac{dr}{4}} - 1 \approx r\left(1 - \frac{dr}{2}\right) - 1 \qquad (41)$$

$$= (1 + dr)\left(1 - \frac{dr}{2}\right) - 1 \approx 1 + \frac{dr}{2} - 1 = \frac{dr}{2}.$$

Thus the measured amplitude mismatch dr' is half of the actual amplitude mismatch dr. From equations (41) and (38a) we obtain the real amplitude mismatch dr and the real non-orthogonality $\varepsilon$, respectively:

$$dr = 2\left(\frac{A_s'}{A_c'} - 1\right), \text{ and} \qquad (42)$$

$$\varepsilon = -2\left(\frac{A_{s1c}'}{A_{s1s}'} + \frac{A_{c1s}'}{A_{c1c}'}\right). \qquad (43)$$

From equations (21) and (22) we obtain the measured, normalized amplitude components $a_{s3s}'$, $a_{s3c}'$, $a_{c3s}'$ and $a_{c3c}'$ of the third harmonic (p=3):

$$a_{s3s}' = \frac{2}{M}\sum_{n=0}^{M-1} s_{s3}\sin 3u = \frac{a_3}{2}\cos\varphi_{s3} - \frac{a_5}{2}\cos\varphi_{s5} - \frac{dr}{4}; \qquad (44)$$

$$a_{s3c}' = \frac{2}{M}\sum_{n=0}^{M-1} s_{s3}\cos 3u = \frac{a_3}{2}\sin\varphi_{s3} - \frac{a_5}{2}\sin\varphi_{s5} + \frac{\varepsilon}{4}; \qquad (45)$$

$$a_{c3s}' = \frac{2}{M}\sum_{n=0}^{M-1} s_{c3}\sin 3u = \frac{a_3}{2}\sin\varphi_{s3} - \frac{a_5}{2}\sin\varphi_{s5} - \frac{\varepsilon}{4}; \text{ and} \qquad (46)$$

$$a_{c3c}' = \frac{2}{M}\sum_{n=0}^{M-1} s_{c3}\cos 3u = -\frac{a_3}{2}\cos\varphi_{s3} + \frac{a_5}{2}\cos\varphi_{s5} - \frac{dr}{4}. \qquad (47)$$

From these equations one derives:

$$a_3 \cos \phi_{s3} - a_5 \cos \phi_{s5} = a_{s3s}' - a_{c3c}', \qquad (48)$$

and $$a_3 \sin \phi_{s3} - a_5 \sin \phi_{s5} = a_{s3c}' + a_{c3s}' \qquad (49)$$

The third-order harmonic cannot be determined independently from the fifth-order harmonic, but an approximate value can be derived if $a_5 \ll a_3$. If $a_5 \ll a_3$, then $$a_3 \approx |a_{s3s}' - a_{c3c}'|, \text{ and} \qquad (50)$$

$$\varphi_{s3} = \cos^{-1}\left(\frac{a_{s3s}' - a_{c3c}'}{a_3}\right), \qquad (51)$$

because $\phi_{s3}$ is either 0 or $\pi$. The measured amplitude $A_3$ of the third-order harmonic is then approximately:

$$A_3 = A_{s,c} a_3 \approx A_{s,c}' a_3 = |A_{s3s}' - A_{c3c}'|, \qquad (52)$$

where $A_{s,c}$ is either $A_s$ or $A_c$. If the fifth-order harmonic is much stronger than the third-order harmonic, $$a_5 \approx |a'_{s3s} - a'_{c3c}|, \tag{53}$$

$$\varphi_{s5} = \cos^{-1}\left(-\frac{a'_{s3s} - a'_{c3c}}{a_5}\right), \text{ and} \tag{54}$$

$$A_5 = A_{s,c} a_5 \approx A_{s,c}' a_5 = |A_{s3s}' - A_{c3c}'|. \tag{55}$$

From equations (44)–(47) there is an alternative way of determining the amplitude mismatch, dr, and the orthogonality error, $\epsilon$:

$$dr = -2(a_{s3s}' + a_{c3c}'), \tag{55a}$$

and $$\epsilon = 2(a_{s3c}' - a_{c3s}'). \tag{55b}$$

The normalized amplitude components $a_{s5s}'$, $a_{s5c}'$, $a_{c5s}'$, and $a_{c5c}'$ of the fifth-order harmonic (p=5) are:

$$a'_{s5s} = \frac{2}{M}\sum_{n=0}^{M-1} s_{s5} \sin 5u = \frac{a_5}{2}\cos\varphi_{s5} - \frac{a_3}{2}\cos\varphi_{s3}; \tag{56}$$

$$a'_{s5c} = \frac{2}{M}\sum_{n=0}^{M-1} s_{s5} \cos 5u = \frac{a_5}{2}\sin\varphi_{s5} - \frac{a_3}{2}\sin\varphi_{s3}; \tag{57}$$

$$a'_{c5s} = \frac{2}{M}\sum_{n=0}^{M-1} S_{c5} \sin 5u = -\frac{a_5}{2}\sin\varphi_{s5} + \frac{a_3}{2}\sin\varphi_{s3} \text{ and} \tag{58}$$

$$a'_{c5c} = \frac{2}{M}\sum_{n=0}^{M-1} s_{s5} \cos 5u = \frac{a_5}{2}\cos\varphi_{s5} - \frac{a_3}{2}\cos\varphi_{s3}. \tag{59}$$

Again, the third-order and fifth-order harmonics cannot be separated. The results shown in equations (56)–(59) do not provide more information than the results obtained for the third-order harmonic above. Only if one harmonic is much stronger than the other is it possible to get an approximate answer for that harmonic. One derives:

$$a_3 \cos\phi_{s3} - a_5 \cos\phi_{s5} = -(a_{s5s}' + a_{c5c}'), \tag{60}$$

and $$a_3 \sin\phi_{s3} - a_5 \sin\phi_{s5} = -(a_{s5c}' - a_{c5s}'). \tag{61}$$

If $a_5 \gg a_3$, then:

$$A_5 = A_{s,c} a_5 \approx A_{s,c}' a_5 = |A_{s5s}' + A_{c5c}'|, \text{ and} \tag{62}$$

$$\varphi_{s5} = \cos^{-1}\left(\frac{A_{s5s}' + A_{c5c}'}{A_5}\right). \tag{63}$$

Therefore, in general, for a pair of orders p and p+2, where p=4n-1, n=1, 2, 3, . . . , then:

$$a_p\cos\varphi_{sp} - a_{p+2}\cos\varphi_{s(p+2)} = a'_{sps} - a'_{cpc}, \tag{64}$$

$$a_p\sin\varphi_{sp} - a_{p+2}\sin\varphi_{s(p+2)} = a'_{spc} + a'_{cps}, \tag{65}$$

$$a_p\cos\varphi_{sp} - a_{p+2}\cos\varphi_{s(p+2)} = -(a'_{s(p+2)s} + a'_{c(p+2)c}), \text{ and} \tag{66}$$

$$a_p\sin\varphi_{sp} - a_{p+2}\sin\varphi_{s(p+2)} = -(a'_{s(p+2)c} - a'_{c(p+2)s}). \tag{67}$$

If the p-order harmonic is much stronger than the (p+2)-order harmonic, then:

$$A_p = A_{s,c}a_p \approx A_{s,c}'a_p = |A_{sps}' - A_{cpc}'| = |A_{s(p+2)s}' + A_{c(p+2)c}'|, \text{ and} \tag{68}$$

$$\varphi_{sp} = \cos^{-1}\left(\frac{A_{sps}' - A_{cpc}'}{A_p}\right) = \cos^{-1}\left(-\frac{A_{s(p+2)s}' + A_{c(p+2)c}'}{A_p}\right). \tag{69}$$

If the (p+2)-order harmonic is much stronger than the pth-order harmonic, $$A_{p+2} = A_{s,c}a_{p+2} \approx A_{s,c}'a_{p+2} = |A_{sps}' - A_{cpc}'| \tag{70}$$
$$= |A_{s(p+2)s}' + A_{c(p+2)c}'|,$$

and $$\varphi_{sp} = \cos^{-1}\left(-\frac{A_{sps}' - A_{cpc}'}{A_p}\right) = \cos^{-1}\left(\frac{A_{s(p+2)s}' + A_{c(p+2)c}'}{A_p}\right). \tag{71}$$

Figure 8A:
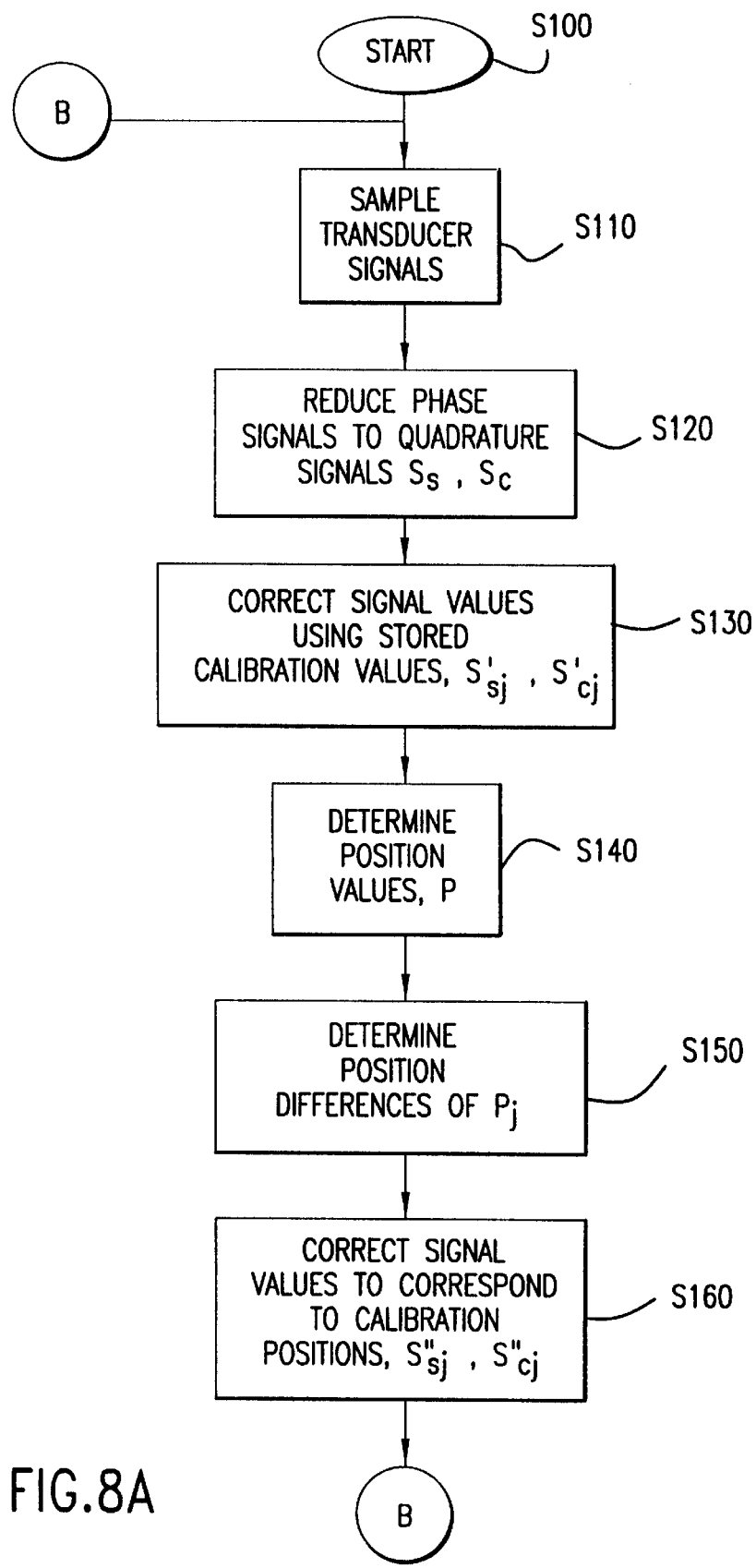
FIGS. 8A and 8B is a flow chart of a preferred control routine for the self-calibrating position transducer of FIG. 3.
Figure 8B:
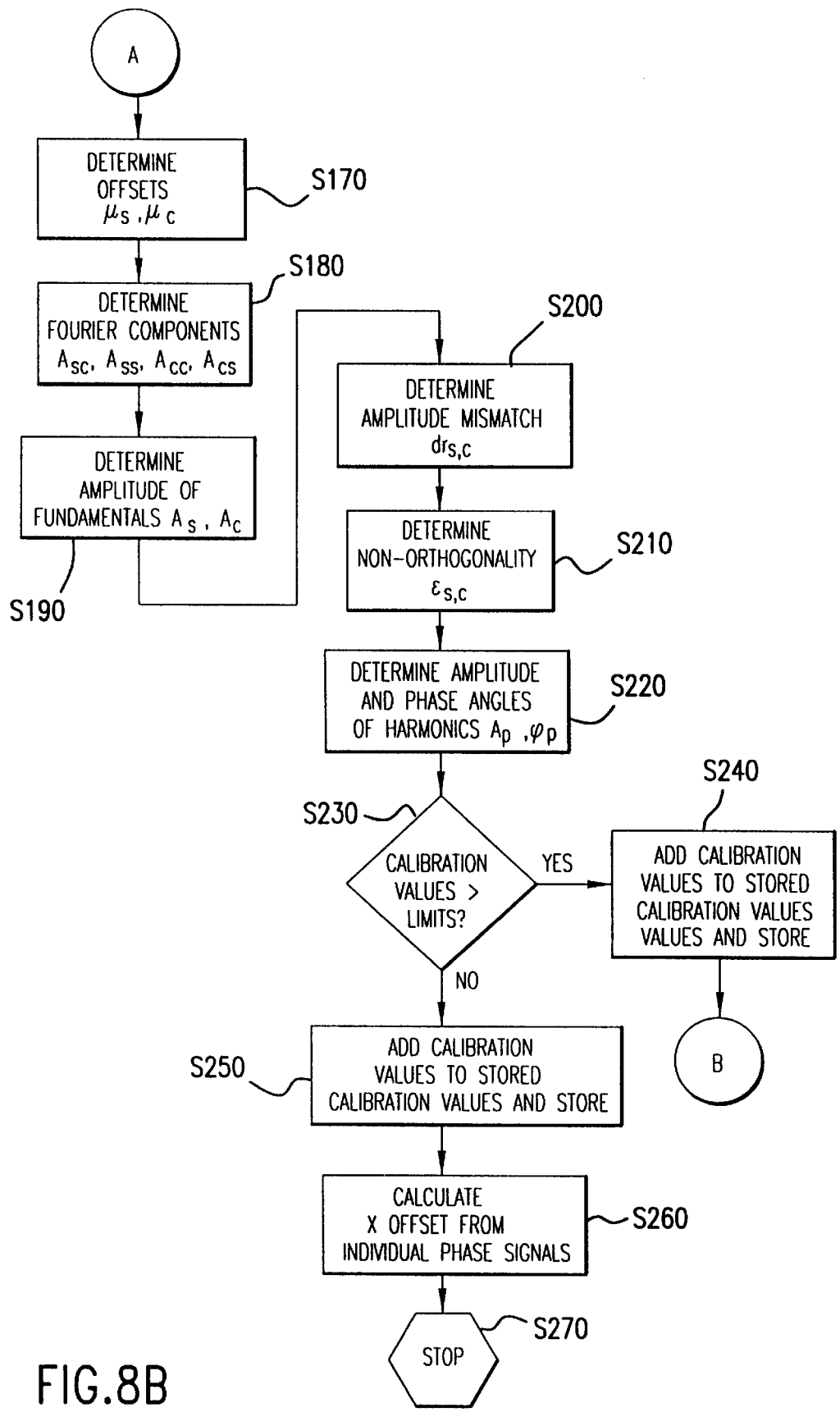

FIGS. 8A and 8B show a preferred control routine for the self-calibrating method of this invention. The routine starts at step S100 and proceeds to step S110, where the controller 240 samples the signals $S_{sj}$ and $S_{cj}$ output by the position transducer 100 at M evenly-spaced calibration positions $P_{0j}$ within one scale period, using the transducer 100 itself as a position reference. The subscript "j" indicates the calibration position number. The calibration positions are:

$$u = j2\frac{\pi}{M} + \varphi, \tag{72}$$

where $\phi$ is an arbitrary initial angle.

These values may be obtained sequentially during a special positioning procedure, or they may be accumulated non-sequentially over the course of normal operation of the transducer, a sample being stored for analysis whenever the transducer position is sufficiently near to a desired sample position.

As explained above, the number of calibration positions M is preferably not equal to any of the harmonic orders contained in the signals. In the preferred embodiment, the number of calibration positions M is equal to 4N, where N is the order of the highest order harmonic component for which the signals $S_c$ and $S_s$ are being compensated.

The method of this invention is not limited to transducers that directly generate the quadrature signals $S_c$ and $S_s$ described above. Rather, the method of this invention can also be used to provide self calibration to transducers producing an arbitrary number of signals that are evenly spaced over 360° of phase. That is, 3 signals separated by 120°, 5 signals separated by 72°, etc. In the general case of N evenly spaced phases, the transducer signals, at each position x, can be reduced to two signals in quadrature, one sine signal, $S_s(x)$, and one cosine signal, $S_c(x)$, by using the following formulas:

$$S_s(x) = \frac{2}{N}\sum_{i=0}^{N-1} S_i(x)\sin\left(i2\frac{\pi}{N}\right), \tag{73}$$

and

-continued $$S_c(x) = \frac{2}{N} \sum_{i=0}^{N-1} S_i(x) \cos\left(i2\frac{\pi}{N}\right), \quad (74)$$

where $S_i(x)$ are the phase signal values at position x. Step S120 determines the reduced signals $S_s(x)$ and $S_c(x)$, rather than the individual phase signals.

Next, at step S130, the values of the signals $S_{sj}$ and $S_{cj}$ are corrected using previously initialized, or previously determined and stored, calibration values $C_i$ to yield corrected signal values $S'_{sj}$ and $S'_{cj}$. Then, at step S140, the transducer position values $P_j$ corresponding to the corrected signal values $S'_{sj}$ and $S'_{cj}$ are determined.

At step S150, the difference $dP_j$ between the determined transducer positions $P_j$ and the corresponding calibration positions $P_{0j}$ are determined as:

$$dP_j = P_j - P_{0j}. \quad (75)$$

Next, at step S160, the signals $S'_{sj}$ and $S'_{cj}$ are position-corrected using the position errors $dP_j$ as follows:

$$S''_{sj} = S'_{sj} - \frac{dS'_{sj}}{dv} dP_j \approx S'_{sj} - S'_{cj} \cdot dP_j; \quad (76)$$

and $$S''_{cj} = S'_{cj} - \frac{dS'_{cj}}{dv} dP_j \approx S'_{cj} + S'_{sj} \cdot dP_j, \quad (77)$$

where $S''_{sj}$ and $S''_{cj}$ are the position-corrected signals.

At step S170, the DC offsets $\mu_s$ and $\mu_c$ are determined as:

$$\mu_s = 2 \cdot \frac{1}{M} \sum_{j=0}^{M-1} S''_{sj}; \quad (78)$$

and $$\mu_c = 2 \cdot \frac{1}{M} \sum_{j=0}^{M-1} S''_{cj}. \quad (79)$$

At step S180, the Fourier amplitude components $A_{ss}'$, $A_{sc}'$, $A_{cs}'$, and $A_{cc}'$ are determined as:

$$A'_{ss} = \frac{2}{M} \sum_{j=0}^{M-1} \sin u \cdot S''_{sj}; \quad (80)$$

$$A'_{sc} = \frac{2}{M} \sum_{j=0}^{M-1} \cos u \cdot S''_{sj}; \quad (81)$$

$$A'_{cs} = \frac{2}{M} \sum_{j=0}^{M-1} \sin u \cdot S''_{cj}; \quad (82)$$

and $$A'_{cc} = \frac{2}{M} \sum_{j=0}^{M-1} \cos u \cdot S''_{cj}. \quad (83)$$

Next, at step S190, the amplitudes of the fundamentals, $A_s'$ and $A_c'$, are determined as:

$$A'_s = \sqrt{A'^2_{sc} + A'^2_{ss}}, \quad (84)$$

and $$A'_c = \sqrt{A'^2_{cc} + A'^2_{cs}}. \quad (85)$$

Then, at step S200, the amplitude mismatching $dr_{s,c}$ is determined as:

$$dr_{s,c} = 2 \cdot \left(\frac{A'_s}{A'_c} - 1\right). \quad (86)$$

At step S210, the non-orthogonality $\epsilon_{s,c}$ is determined as:

$$\varepsilon_{s,c} = -2\left(\frac{A'_{sc}}{A'_{ss}} + \frac{A'_{cs}}{A'_{cc}}\right). \quad (87)$$

Next, at step S220, the amplitude $A_p$ and phase $\phi_p$ of the p-order harmonics are determined. In the preferred embodiment, only the amplitude $A_3$ and phase $\phi_3$ of the third-order harmonic are determined as:

$$A_3 = |A'_{s3s} - A'_{c3c}|; \quad (88)$$

and $$\varphi_3 = \cos^{-1}\left(\frac{A'_{s3s} - A'_{c3c}}{A_3}\right). \quad (89)$$

Then, at step S230, the calibration values $\mu_s$, $\mu_c$, $dr_{s,c}$, $\epsilon_{s,c}$, and $A_3$ are compared to predetermined calibration limits. If any one of the determined calibration values exceeds its corresponding calibration limit, the control routine continues to step S240. Otherwise, if none of the determined calibration values exceeds its corresponding calibration limit, control jumps to step S250.

At step S240, the computed calibration values are added to the previously stored values. Control then jumps back to step S110 and the calibration routine is repeated. In step S250, the calibration values are added to the stored calibration values, as in step S240, and the result is saved as the new calibration values. It should be appreciated that the actions performed in steps S240 and S250 can be combined as a single step, which is performed before step S230. In this case, when one of the calibration values exceeds the corresponding limit, control jumps directly from step S230 to step S110.

Thus, even if the position transducer does not produce signals in quadrature as the normal output, the transducer is thus calibrated and is accurate, except for a position offset. The position offset is determined at step S260 and the process stops at step S270.

For example, the position offset is, for a three-phase system:

$$x_{offset} = -\frac{\lambda}{2\pi}\left(\frac{dr_{21} - dr_{31}}{2\sqrt{3}} + \frac{\varepsilon_{21} + \varepsilon_{31}}{2}\right), \quad (90)$$

where:
  $dr_{21}$ and $dr_{31}$ are the amplitude mismatches of signals $S_2$ and $S_3$ relative to $S_1$,
  $\epsilon_{21}$ and $\epsilon_{31}$ are the angle errors of signals $S_2$ and $S_3$ relative to $S_1$, and
  $\lambda$ is the transducer wavelength.

In order to obtain the quantities $dr_{21}$, $dr_{31}$, $\epsilon_{21}$, and $\epsilon_{31}$, Fourier analysis is performed on the individual phase signals using the corrected reduced signals $S_s(x)$ and $S_c(x)$ for determining the sampling positions. The position offset is not a problem here because it does not affect the result of the Fourier analysis.

The Fourier analysis yields the offsets, the amplitude mismatching, the phase errors, and the third harmonic content of the individual phase signals. With the error parameters obtained from the Fourier analysis, the position offset, $x_{offset}$, can be determined directly.

Alternatively, the offsets, the amplitude mismatching, the phase errors, and the third harmonic content of the individual phase signals can be used to correct the individual phase signals before they are reduced to the quadrature signals $S_s(x)$ and $S_c(x)$, after which correct transducer positions are obtained from the formula:

$$x = \frac{\lambda}{2\pi}\tan^{-1}\left(\frac{S_s(x)}{S_c(x)}\right). \quad (91)$$

It should be understood that step S120 needs only be performed in a transducer system that does not provide quadrature signals. In a transducer which produces quadrature signals, step S120 may be omitted. While the above-outlined description has used Fourier analysis as one processing alternative, it should be appreciated that any comparable known method for analyzing the N phase signals can be used as well. For example, for decomposing a periodic signal into a series of constituent components, wavelet analysis could be used.

It should also be appreciated that, after the offset values are determined in step S270, the offset values are used to correct a position information signal output from the transducer system 200. In particular, the signal corrector 210 outputs the position information signal corrected for local transducer signal errors. Local transducer signal errors may be caused by imperfect fabrication, misalignment and spatial harmonics which cannot be economically eliminated from the transducer design.

The above-outlined calibration method is used to calibrate the transducer system 200 shown in FIG. 3 whenever it is in a non-calibrated state. Usually, the transducer system 200 will be in this non-calibrated state only just after it has been manufactured or installed. However, the transducer system 200 can also be placed in a non-calibrated state if, for some reason, the calibration values determined in steps S100–S270 are lost or deleted. In this case, the initial values for the calibration values are set to zero.

Once the transducer system 200 has been calibrated, the stored calibration values are used to correct one or more values related to the transducer signals output from the transducer 100. In particular, if the signal corrector 210 outputs a position signal indicative of the relative position between the read head 110 and the scale 120 of the transducer 100, the signal corrector corrects the determined position signal based on the offset value determined in step S260. Thus, the calibration data is used during normal operation of the transducer system.

Figure 9:
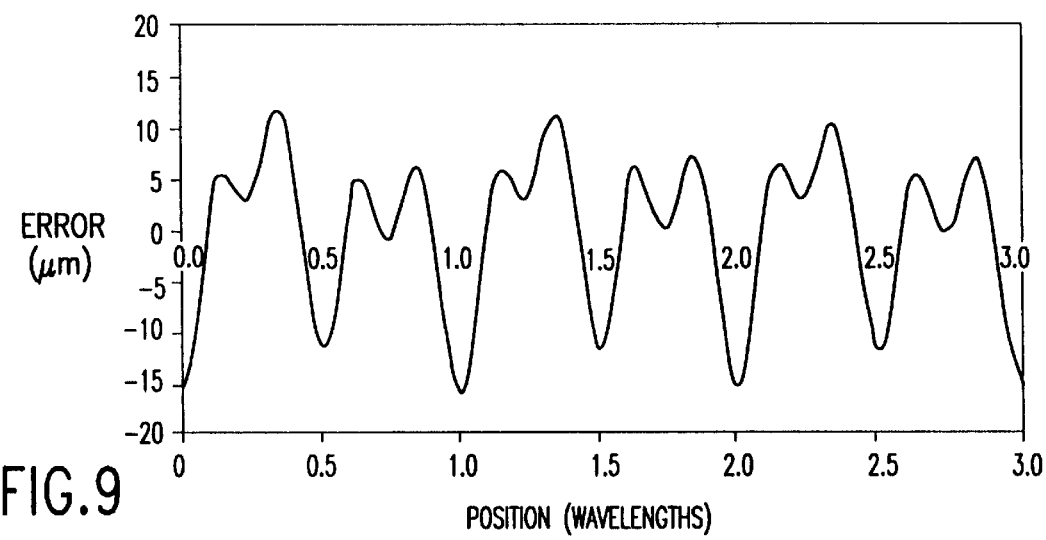
FIG. 9 shows an uncompensated output signal from a representative position transducer.

FIG. 9 shows a plot of the error of an output signal against the relative position between the scale 120 and the read head 110 as they move relative to each other along the measuring axis 130 for the position transducer 100. The measured parameters for the transducer signals, with the position transducer 100 used as a reference, are:

$\mu_s$=−4.4 mV;

$\mu_c$=−1.4 mV;

$A_s$=2.637 V;

$A_c$=2.614 V;

r=1.0088;

$\epsilon$=0.0143 radians;

and $A_3$=0.020 V, which yields:

$m_s$=−0.17%

$m_c$=−0.05% dr=0.88%

$\epsilon$=0.0143 radians $a_3$=0.76%.

The measured parameters for the transducer signals, using a laser interferometer as a reference, are:

$\mu_s$=−4.5 mV;

$\mu_c$=−3.0 mV;

$A_s$=2.637 V;

$A_c$=2.615 V;

r=1.0086;

$\epsilon$=0.0171 radians;

and $A_3$=0.020 V, which yields:

$m_s$=−0.17%

$m_c$=−0.11% dr=0.86%

$\epsilon$=0.0171 radians $a_3$=0.76%.

Figure 10:
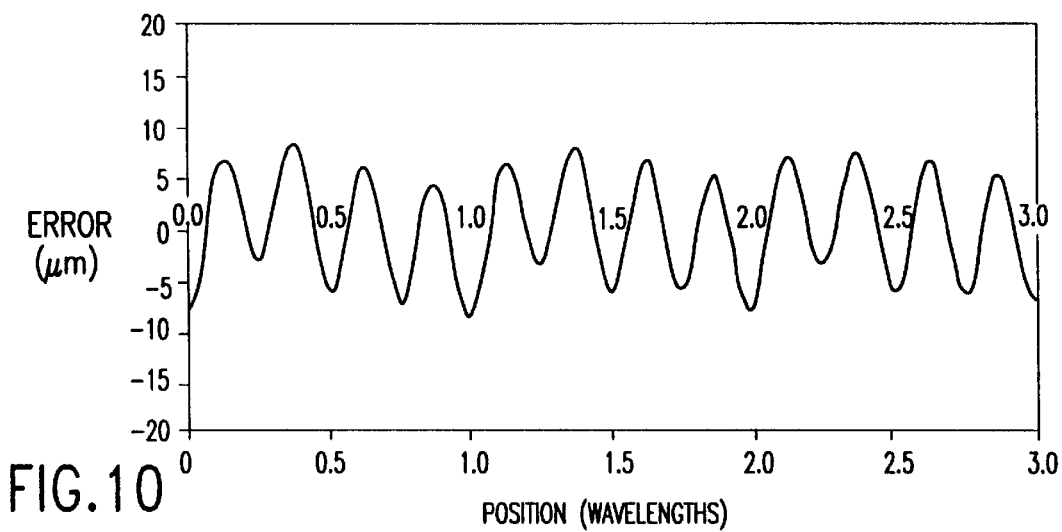
FIG. 10 shows an output signal from a representative position transducer for which the offsets, difference in amplitudes of the fundamentals and the non-orthogonality between the fundamentals are compensated using the method of this invention.

FIG. 10 shows a plot of the error against the relative position between the scale 120 and the read head 110 as they move relative to each other along the measuring axis 130 for the position transducer 100, where the DC offsets, differences in amplitudes of the fundamentals and non-orthogonality between the fundamentals are compensated for using the method of this invention.

Figure 11:
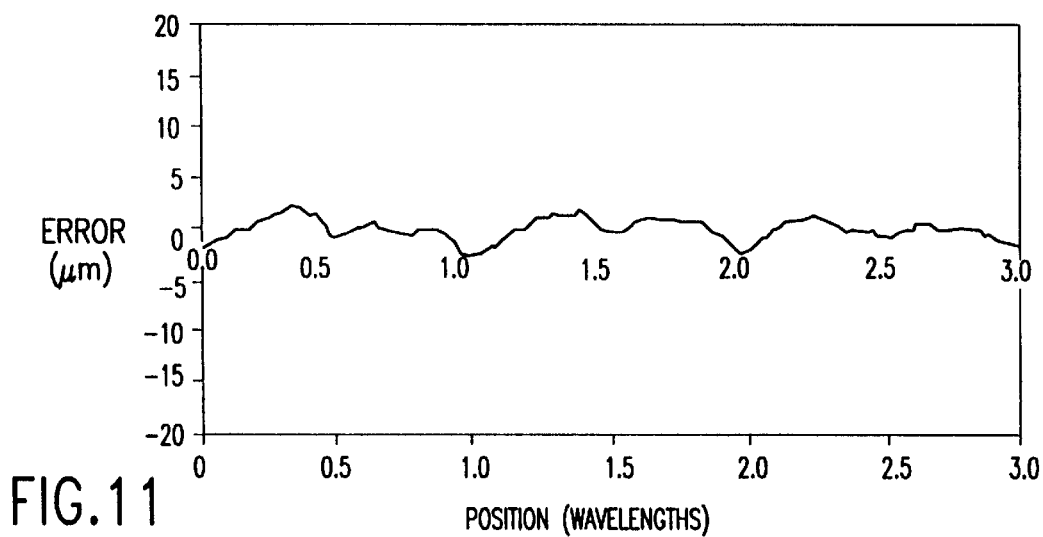
FIG. 11 shows an output signal from a representative position transducer for which the offsets, difference in amplitudes of the fundamentals, the non-orthogonality between the fundamentals and the third-order harmonic component are compensated using the method of this invention.

FIG. 11 shows a plot of the error against the relative position between the scale 120 and the read head 110 as they move relatively to each other along the measuring axis 130 for the position transducer 100, where the DC offsets, differences in amplitudes of the fundamentals, non-orthogonality between the fundamentals and the third-order harmonic components are compensated for as using the method for this invention.

The transducer system 200 is not limited to determining the calibration values only from the non-calibration state. Rather, the transducer system 200 can either update the calibration values upon an explicit signal from the operator or from the controller 240, as shown in FIG. 12, or generally continually as a background process as the transducer system 200 is used, as shown in FIG. 13.

Thus, in the first case, the transducer system 200 uses the stored calibration values during normal operation. In particular, after the calibration values were last determined, they are not updated until an explicit calibration command is received or generated by the controller 240. The calibration command can be received by the controller 240 through an input interface of the transducer system 200 from a user. The user will typically generate the calibration command whenever the user believes that the accuracy of the transducer system is insufficient due to no-longer-accurate calibration values. Alternatively, the controller 240 can be programmed to generate the calibration command in response to any number of situations, such as length of time of operation. In either case, the controller 240, in response to this explicit command, controls the signal corrector to determine new calibration values from the transducer signals input from the transducer 100 as the transducer system 200 is used.

Similarly, in the second case, the transducer system 200 also uses the stored calibration values during normal operation. However, in the second case, the calibration values are automatically redetermined in the background as the transducer system 200 is used during normal operation. In particular, as the transducer 200 is used during normal operation, the controller 240 determines if the speed of the read head 110 past the scale 120 is sufficiently slow enough that the transducer signals from the transducer 100 are usable for the calibration determination outlined above. The speed of the read head is generally determined as the rate of change of the corrected position signal output by the signal corrector 210.

If the speed is slow enough, the raw transducer signals are sampled at the prescribed sample positions outlined above, as described above in step S110. It should be appreciated that the samples at the prescribed sample positions do not have to be taken in order. Rather, the samples can be taken over a period of operation in any random or non-sequential order depending on the motion of the transducer 100. The sampled transducer signals are then stored for the calibration process. Otherwise, the raw transducer signal are merely processed to obtain the desired position information signals. The normal operation of the transducer system 200 continues until a sufficient number of samples are obtained.

Once a sufficient number of samples are obtained, the transducer system 200 is recalibrated to update the calibration values based on the new samples. After the calibration values are updated, the transducer system 200 continues its normal operation, until another sufficient number of samples are obtained.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A self-calibrating position transducer system, comprising:
   a position transducer having a read head and a scale, the position transducer generating at least one transducer signal that varies as a periodic function of relative position between the read head and the scale;
   a memory that stores calibration values;
   a signal corrector that receives the at least one transducer signal and corrects at least one value related to the at least one transducer signal using the stored calibration values;
   an analyzer that determines new calibration values based on the at least one transducer signal, using the transducer itself as a position reference, the stored calibration values being revised based on the new calibration values; and
   a controller that controls the transducer, the signal corrector, the memory and the analyzer.

2. The self-calibrating position transducer system of claim 1, wherein the signal corrector outputs a position information signal corrected for local transducer signal errors.

3. The self-calibrating position transducer system of claim 1, wherein the stored calibration values are initially zero.

4. The self-calibrating position transducer system of claim 1, wherein the analyzer determines new calibration values based on corrected values of the transducer signal.

5. The self-calibrating position transducer system of claim 1, wherein the at least one transducer signal comprises a pair of transducer signals in quadrature.

6. The self-calibrating position transducer system of claim 1, wherein the at least one transducer signal comprises an arbitrary number of transducer signals that are evenly spaced over 360° of phase.

7. The self-calibrating position transducer system of claim 6, wherein the arbitrary number of transducer signals comprises 3 transducer signals that are spaced at 120°.

8. The self-calibrating position transducer system of claim 6, wherein the transducer signals are reduced to two signals in quadrature.

9. The self-calibrating position transducer system of claim 1, wherein the signal corrector samples the transducer signals at a plurality of approximately evenly-spaced calibration positions within each sampled scale wavelength of the position transducer.

10. The self-calibrating position transducer system of claim 1, wherein the at least one value corrected by the signal corrector comprises at least one of DC offsets, amplitude mismatching between the transducer signals, phase shift between the transducer signals and position offset.

11. The self-calibrating position transducer system of claim 10, wherein the signal corrector corrects for errors in the transducer signals which exhibit a spatial frequency of at least two times a fundamental spatial frequency of the transducer signals.

12. A method for self-calibrating a position transducer without referring to an external reference, the position transducer having a read head, a scale and a memory, and generating at least one transducer signal that varies as a periodic function of relative position between the read head and the scale, the method comprising:
   sampling the at least one transducer signal at a plurality of prescribed sample positions;
   determining new signal calibration values based on the plurality of samples of the at least one sampled transducer signal; and
   revising calibration values stored in the memory based on the new calibration values.

13. The self-calibration method of claim 12, further comprising outputting position information corrected for local transducer signal errors based on the stored calibration values.

14. The self-calibration method of claim 12, wherein determining the new signal calibration values comprises using Fourier analysis.

15. The self-calibration method of claim 12, further comprising, when the at least one transducer signal comprises at least three transducer signals, reducing the at least three transducer signals to two signals in quadrature.

16. The self-calibration method of claim 12, wherein sampling the at least one transducer signal comprises sampling each at least one transducer signal at a plurality of evenly-spaced calibration positions within each sampled scale wavelength of the position transducer.

17. The self-calibration method of claim 12, wherein the at least one transducer signal comprises two transducer signals in quadrature.

18. The self-calibration method of claim 12, wherein determining the new calibration values comprises:

determining corrected sampled transducer signals based on the stored calibration values;

determining transducer positions from the corrected sampled transducer signals;

determining a position difference between each transducer position and a corresponding desired transducer calibration position;

correcting the values of the corrected sampled transducer signals based on the determined position differences to reflect signal values at the desired transducer calibration positions; and determining the new calibration values based on the corrected values of the corrected sampled transducer signals.

19. The self-calibration method of claim 12, wherein determining the new calibration values comprises at least one of:

determining an amplitude of fundamentals of the position-corrected sampled transducer signals;

determining DC offsets of the position-corrected sampled transducer signals;

determining at least one amplitude mismatch between the position-corrected transducer signals;

determining at least one phase shift error between the position-corrected sampled transducer signals; and determining the position offset.

20. The self-calibration method of claim 12, further comprising:

comparing the new calibration values to predetermined calibration limits; and repeating the sampling, determining and revising steps if at least one of the new calibration values exceeds a corresponding calibration limit.

21. The self-calibration method of claim 12, wherein at least the sampling step is performed as a background process during normal operation of the position transducer.

* * * * *